Patented May 29, 1945

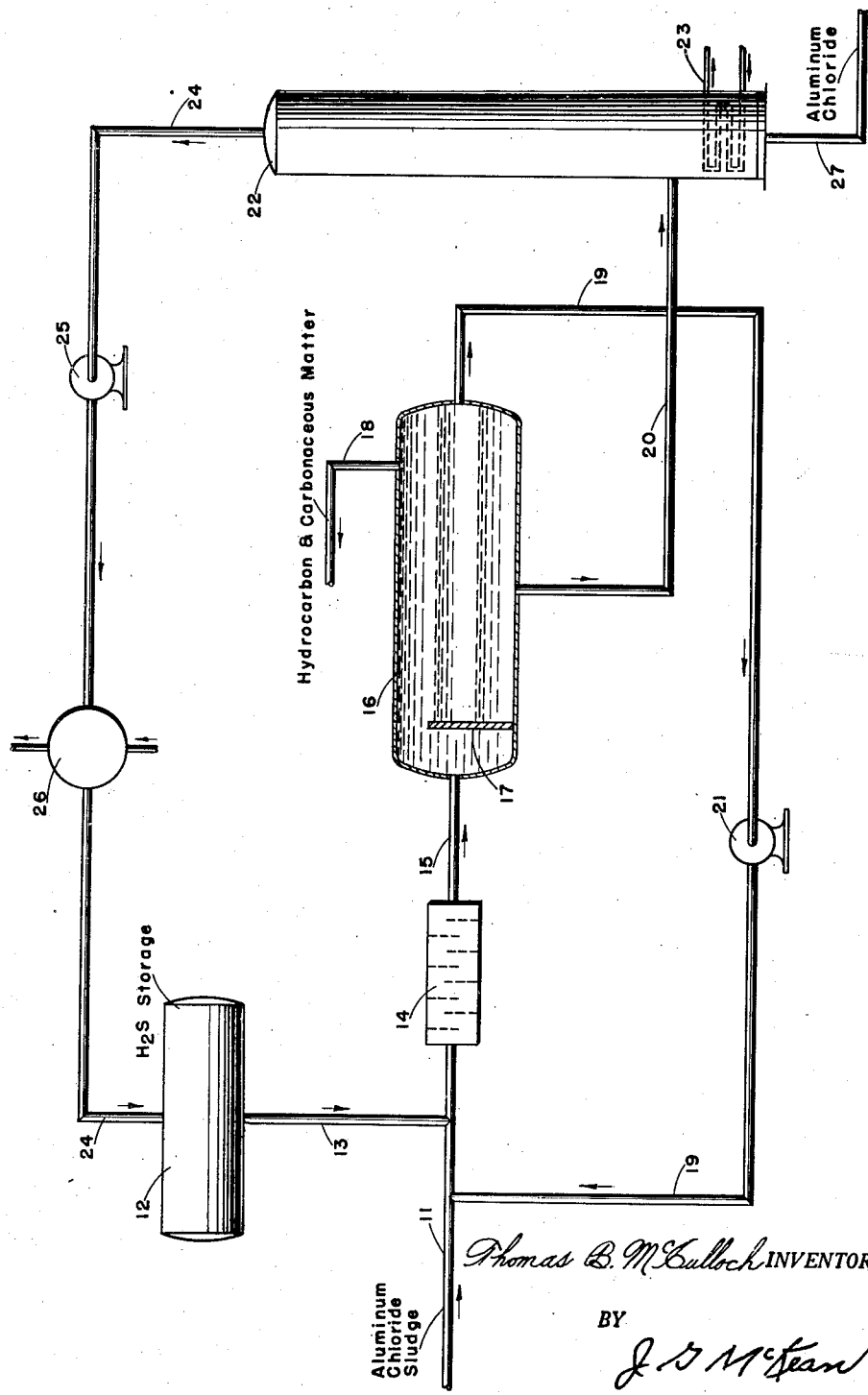

2,377,090

UNITED STATES PATENT OFFICE 2,377,090

RECOVERY OF ALUMINUM CHLORIDE

Thomas B. McCulloch, Baytown, Tex., assignor to Standard Oil Development Company, a corporation of Delaware Application June 5, 1943, Serial No. 489,788

4 Claims. (Cl. 23—96)

The present invention relates to a method for recovery of aluminum chloride from aluminum chloride-containing sludges. More particularly, it is concerned with recovery of aluminum chloride from the aluminum chloride-hydrocarbon complexes discarded from certain conversion operations.

In certain isomerization and other conversion operations, it is customary to employ as the catalyst for the reaction a complex of aluminum chloride and a hydrocarbon. This complex is mobile and under the conditions employed is easily handled in pumps and pipe lines. However, after a period of time the catalytic activity of the aluminum chloride-hydrocarbon complex is lost, the complex must be discarded, and fresh catalytic material employed.

The aluminum chloride-hydrocarbon complexes discarded in the above mentioned operations result in a considerable loss in that valuable amounts of aluminum chloride are discarded in the complex. It is, therefore, the main object of the present invention to make available a process whereby the aluminum chloride discarded from the aforementioned operations is recovered for re-use.

It has been proposed by others to recover aluminum chloride from its sludges with hydrocarbons by treating the sludges with anhydrous liquid hydrogen chloride, with carbon monoxide, and with other reagents.

It has now been discovered that aluminum chloride-hydrocarbon complexes may be decomposed by treatment of the complex with hydrogen sulfide. It has been known prior to the present invention that hydrogen sulfide will react with aluminum chloride to form a loose complex compound illustrated by the formula $Al_2Cl_6 \cdot H_2S$. This fact is utilized in the present invention to recover the aluminum chloride from its sludges. By forming the aforementioned complex, it is possible to make a separation between the hydrocarbon and carbonaceous material which form the complex with aluminum chloride and thereby obtain a separation.

In the practice of the present invention, aluminum chloride sludge is admixed with hydrogen sulfide to form the loose complex $Al_2Cl_6 \cdot H_2S$ and the reacted mixture allowed to settle. Carbonaceous material is separated from the aluminum chloride-hydrogen sulfide complex and the two phases are withdrawn separately. The aluminum chloride-hydrogen sulfide complex compound is then decomposed by application of suitable temperatures whereby $H_2S$ is released and aluminum chloride is made available for recovery.

The invention will be better understood by reference to the drawing in which the single figure represents a suitable arrangement of apparatus, in partial section, for conducting one embodiment of the invention.

Referring now to the drawing, numeral 11 represents a charge line through which aluminum chloride sludge is introduced into the system. Hydrogen sulfide from storage tank 12 admixes by way of line 13 with the aluminum chloride sludge in line 11 and the two streams discharge into incorporating device 14. Incorporating device 14 may be any suitable mixing equipment whereby intimate contact between the aluminum chloride sludge and the hydrogen sulfide is obtained. The reacted mixture leaves incorporator 14 by way of line 15 and discharges into settling zone 16 which is equipped with weir box 17; settling zone 16 is provided with line 18 for withdrawal of carbonaceous matter or liquid hydrocarbons, line 19 for recycling of unreacted aluminum chloride sludge, and line 20 for withdrawal of the loose complex of aluminum chloride and hydrogen sulfide.

The reacted mixture introduced into settling zone 16 flows through weir box 17 and overflows into the main body of zone 16 which is of sufficient capacity to allow time for stratification of the reacted mixture.

Since two moles of aluminum chloride are required to react with one mole of hydrogen sulfide to form the complex aluminum chloride-hydrogen sulfide compound, it is necessary to employ in the operation an excess of aluminum chloride sludge; therefore, about four moles of aluminum chloride per mole of hydrogen sulfide is introduced, thus assuring completion of the reaction. Since an excess of aluminum chloride sludge is employed, provision must be made for separating out the excess material and recycling it to the charge line. Therefore, an intermediate layer is withdrawn from settling zone 16 by way of line 19 and is pumped by means of pump 21 to line 11 where it admixes with additional quantities of hydrogen sulfide introduced by way of line 13.

The hydrocarbon and other carbonaceous material withdrawn from settling zone 16 by way of line 18 may be handled or treated in any manner desired.

The aluminum chloride-hydrogen sulfide complex discharged from settling zone 16 by line 20 is introduced thereby into distilling zone 22 which is equipped with heating means 23, line 24 and line 25.

In distilling zone 22, the temperature of the aluminum chloride-hydrogen sulfide complex is raised to the point where the loose complex is decomposed and hydrogen sulfide is released to line 24 connecting to storage tank 12; line 24 is equipped with pump or compressing means 25 and cooling means 26.

The aluminum chloride is withdrawn from distillation zone 22 by way of line 27 for recycling to the conversion process.

The hydrogen sulfide injected into line 11 in storage tank 12 may be injected thereto in the liquid phase; however, it is preferred to inject the hydrogen sulfide in the gaseous phase in a slow stream so that as it meets the incoming aluminum chloride sludge, reaction takes place. In most instances it would be undesirable to employ the hydrogen sulfide in the liquid phase since, at the low temperature at which liquid hydrogen sulfide reacts with aluminum chloride, the sludge would be too viscous for handling. If the hydrogen sulfide were maintained in the liquid phase throughout the system it would be necessary to employ higher pressures when operating at room temperature or thereabouts, which would require expensive equipment.

It is preferred that the hydrogen sulfide in storage tank 12 be maintained in the liquid phase, since hydrogen sulfide can be more economically stored in pressure equipment than it can be in atmospheric equipment. Since hydrogen sulfide has a relatively high vapor pressure at normal atmospheric temperatures, storage tank 12 should be of sufficient strength to withstand pressures in the neighborhood of 600 or 700 lbs. Compression means 25 and cooling means 26 allows liquefaction of the gaseous hydrogen sulfide released from distillation zone 22 by way of line 24.

The temperature employed in distillation zone 22 should be maintained at about 57° F. to allow decomposition of the compound $Al_2Cl_6 \cdot H_2S$. Pressures should be about atmospheric. The temperature of the sludge and hydrogen sulfide introduced into line 11 should be maintained between 32° and 50° F. when the hydrogen sulfide is introduced in the gaseous phase. It has been observed that the heat of formation for the compound $Al_2Cl_6 \cdot H_2S$ at 32° F. is 9.22 calories; therefore it may be desirable to cool the reacted mixture to maintain its temperature below 50° F. This may be accomplished by well known means.

It will be noted in the drawing and particularly in settling zone 16, which is shown in section, that three phases are formed. The top phase will comprise hydrocarbon material, the middle phase unreacted aluminum chloride sludge and the bottom phase the aluminum chloride-hydrogen sulfide complex as mentioned before. This is possible by virtue of the fact that the hydrogen sulfide and carbonaceous material making up the top phase will have a specific gravity of one or less while the aluminum chloride sludge will have a specific gravity of about 1.5; the specific gravity of the aluminum chloride-hydrogen sulfide complex is about 2. The different gravities of the three phases allows ready separation thereof.

While the invention has been described with relation to utilization of certain types of apparatus, it is to be understood that other apparatus may be substituted therefor. Particularly, rather than employing a mixing device such as illustrated by incorporator or mixing means 14, a countercurrent absorption tower may be substituted therefor.

In the description above it has been assumed that the aluminum chloride sludge was sufficiently mobile to allow it to be readily pumped and settled. Sludges of this type may be obtained from conversion processes wherein the hydrocarbons charged have molecular weights no greater than those in the gasoline boiling range. It will be understood, however, that aluminum chloride sludges from processes employing heavier oils as the feed stock may be treated in accordance with the present invention by diluting the sludges so that they may be readily admixed with the hydrogen sulfide and so that the resulting phases may be separated by settling. When treating heavy sludges, any suitable diluent may be employed. It has been found that propane and similar low molecular weight hydrocarbons are very satisfactory diluents for this purpose, as they not only reduce the viscosity of the sludge, but in addition may serve as internal refrigerants in maintaining the temperature of the admixture below that at which decomposition of the aluminum chloride-hydrogen sulfide complex occurs.

The nature and objects of the present invention having been fully described and illustrated, what I wish to claim as new and useful and to secure by Letters Patent is:

1. A process for recovering aluminum chloride from complexes consisting of aluminum chloride and carbonaceous material, comprising the steps of reacting an aluminum chloride sludge with hydrogen sulfide, settling said reaction product to form a carbonaceous-containing phase and an aluminum chloride-hydrogen sulfide-containing phase, removing said aluminum chloride-hydrogen sulfide-containing phase from said settling zone, increasing the temperature of said phase to separate it into an aluminum chloride component and a hydrogen sulfide component and separating said components.

2. A process in accordance with claim 1 in which the amount of sludge reacted with the hydrogen sulfide is equivalent to more than two moles of aluminum chloride for each mole of hydrogen sulfide.

3. A process for recovering aluminum chloride comprising the steps of charging an aluminum chloride sludge resulting from the reaction of hydrocarbons with aluminum chloride, admixing said sludge with anhydrous hydrogen sulfide at a temperature no greater than approximately 50° F. whereby an aluminum chloride-hydrogen sulfide complex is formed, passing the mixture to a settling zone and allowing it to separate into a hydrocarbon phase, an aluminum chloride sludge phase and an aluminum chloride-hydrogen sulfide complex phase, removing said hydrocarbon phase from said settling zone, removing said aluminum chloride sludge phase from said settling zone and admixing it with the sludge entering the process, removing the aluminum chloride-hydrogen sulfide phase from said settling zone and increasing the temperature thereof to decompose it into an aluminum chloride component and a hydrogen sulfide component.

4. A process in accordance with claim 3 in which the amount of aluminum chloride sludge admixed with hydrogen sulfide is equivalent to more than two moles of aluminum chloride per mole of hydrogen sulfide.

THOMAS B. McCULLOCH.